(12) United States Patent
Kudo et al.

(10) Patent No.: US 7,943,069 B2
(45) Date of Patent: May 17, 2011

(54) METHOD OF SETTING MOLD CLAMPING FORCE OF INJECTION MOLDING MACHINE

(75) Inventors: Yoshiaki Kudo, Nagano-ken (JP);
Takashi Hakoda, Nagano-ken (JP);
Kiyoshi Nakamura, Nagano-ken (JP);
Susumu Morozumi, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 12/610,851

(22) Filed: Nov. 2, 2009

(65) Prior Publication Data

US 2010/0109182 A1    May 6, 2010

(30) Foreign Application Priority Data

Nov. 6, 2008  (JP) ................ P2008-285420

(51) Int. Cl.
*B29C 45/80* (2006.01)
*B29C 45/67* (2006.01)
(52) U.S. Cl. ............ 264/40.5; 264/328.1; 425/150
(58) Field of Classification Search ........... 264/40.1, 264/40.5, 328.1; 700/200, 203; 425/150
See application file for complete search history.

(56) References Cited

U.S. PATENT DOCUMENTS

| 4,131,596 | A | * | 12/1978 | Allen | ............ 264/40.5 |
| 4,913,638 | A | * | 4/1990 | Buja | ............ 425/140 |
| 4,942,004 | A | * | 7/1990 | Catanzaro | ............ 264/40.5 |
| 5,493,503 | A | * | 2/1996 | Richards et al. | ............ 700/200 |
| 6,048,476 | A | * | 4/2000 | Lausenhammer et al. | ... 264/40.5 |
| 6,562,265 | B2 | * | 5/2003 | Usui et al. | ............ 264/40.5 |
| 7,037,452 | B1 | * | 5/2006 | Speight | ............ 264/40.1 |

FOREIGN PATENT DOCUMENTS

JP        3833140 B2    11/2003

* cited by examiner

*Primary Examiner* — Jill L Heitbrink
(74) *Attorney, Agent, or Firm* — Knoble Yoshida & Dunleavy, LLC

(57) ABSTRACT

When test molding is performed by sequentially clamping a mold with a mold clamping force (100%, 80%, 70%, . . .) obtained by sequentially lowering a mold clamping force by a predetermined amount from the maximum mold clamping force (100%), a mold clamping pressure Pc in an injection process is detected and a plurality of different monitored elements (Pc, Pcd and Per) corresponding to the variation of the mold clamping pressure Pc are monitored, and thus it is detected that at least one of the monitored elements is varied to exceed a predetermined threshold, a mold clamping force obtained by increasing a mold clamping force at the time of the production of the variation by a predetermined amount is set as a proper mold clamping force Fs.

16 Claims, 9 Drawing Sheets

METHOD OF SETTING MOLD CLAMPING FORCE OF INJECTION MOLDING MACHINE

TECHNICAL FIELD

The present invention relates to a method of setting a mold clamping force of an injection molding machine, and such a method is suitably used to set a mold clamping force smaller than the maximum mold clamping force when a mold is clamped by a mold clamping device.

BACKGROUND ART

An injection molding machine is generally provided with a mold clamping device for clamping a mold. In this type of mold clamping device, for example, a high-pressure mold clamping is performed at the maximum mold clamping force of the mold clamping device to achieve secure clamping without the occurrence of flash or the like; however, since an excessive mold clamping force is applied to the mold, the mold is degraded earlier and consumption energy is unnecessarily increased, and stains and damages on the surface of cavities, such as weld marks, burns and black streaks, are produced due to insufficient gas removal, with the result that it is necessary to perform repair process. Thus, if a mold can be clamped with a required minimum mold clamping force, that is, a proper mold clamping force, it is possible to avoid an excessive mold clamping force added to the mold, with the result that it is possible to extend the life of the mold, reduce the consumption energy and avoid the interruption of production and the like.

Conventionally, as the method of setting a proper mold clamping force described above, a method of setting a mold clamping force of an injection molding machine disclosed in patent document 1 proposed by the applicant of the present invention has been already known. The method of setting a mold clamping force disclosed in patent document 1 is a method of setting a mold clamping force of an injection molding machine in which a force for clamping the mold attached to the mold clamping device is set. In this method, the mold clamping force is varied to 1/Nth (N>1) the force at a time from the maximum mold clamping force in a sequential manner; tentative molding is performed at each mold clamping force; the opening of a movable mold at a time of the tentative molding is detected from the amount of reverse rotation of a drive motor for applying pressure to the movable mold; when the opening of the movable mold is detected, the mold clamping force is varied to M times (1<M<N) the force at a time in a sequential manner; after the opening of the movable mold, a mold clamping force when the movable mold is not opened for the first time or a mold clamping force obtained by adding a predetermined extra force to such a mold clamping force is determined; and the obtained mold clamping force is set at a specified mold clamping force.

SUMMARY OF INVENTION

Technical Problem

However, the above-described conventional method of setting a mold clamping force of an injection molding machine suffers from the following problems to be solved.

Firstly, since the number of a monitored factor is one, that is, the opening of a movable mold (the position of a mold) is only monitored, it is difficult to accurately and reliably set the proper mold clamping force. In this case, although it is effective to select a more accurate physical quantity (a monitored factor), the variation of a single physical quantity is basically monitored, and thus it is necessary to achieve further improvement in terms of accuracy and reliability.

Secondly, since the opening of a mold is detected, it is insufficient in terms of determining a proper mold clamping force. Specifically, the opening of a mold means that flash occurs; it is not necessarily appropriate as information used to determine a proper mold clamping force before the occurrence of flash. Thus, since, in consideration of variations in mold clamping force or the like, for example, an extra force (mold clamping force) added is inevitably increased, it is necessary to achieve further improvement in terms of setting a proper (appropriate) mold clamping force.

Solution to Problem

According to one aspect of the present invention, there is provided a method of setting a mold clamping force of an injection molding machine M that sets a mold clamping force smaller than the maximum mold clamping force when a mold 2 is clamped by a mold clamping device Mc, in which test molding is performed by sequentially clamping the mold 2 with a mold clamping force (100%, 80%, 70%, ... ) obtained by sequentially lowering a mold clamping force by a predetermined amount from the maximum mold clamping force (100%); and, when a mold clamping pressure Pc in an injection process is detected with a mold clamping pressure sensor 6 and a plurality of different monitored elements (Pc, Pcd and Pcr) corresponding to the variation of the mold clamping pressure Pc are monitored, wherein the plurality of different monitored elements include at least two of the mold clamping pressure, a differential value of the mold clamping pressure with respect to time and a reduction rate of the mold clamping pressure with respect to time, and thus it is detected that at least one of the monitored elements is varied to exceed a predetermined threshold, a mold clamping force obtained by increasing a mold clamping force at the time of the production of the variation by a predetermined amount is set as a proper mold clamping force Fs.

Advantageous Effects of Invention

With the method of setting a mold clamping force of the injection molding machine M according to the present invention, the following significant benefits are obtained.

(1) The mold clamping pressure Pc in the injection process is detected, and a plurality of different monitored elements (Pc, Pcd and Pcr) corresponding to the variation of the mold clamping pressure Pc are monitored, and thus, if at least one of the monitored elements is varied to exceed the predetermined threshold value, a mold clamping force obtained by increasing the mold clamping force at the time of the production of such a variation by a predetermined amount is set as the proper mold clamping force Fs, with the result that it is possible not only to accurately and reliably set the required minimum proper mold clamping force Fs with which no flash is produced but also to easily set the more accurate proper mold clamping force Fs in an automatic manner.

(2) According to one preferred aspect, as the mold clamping device Mc, a hydraulic direct-pressure type mold clamping device that clamps the mold 2 with the mold clamping cylinder 8 is applied, and thus the reduction rate Pcr of the mold clamping pressure Pc with respect to time based on the fact that oil leaks from the mold clamping cylinder 8 in the injection process can be used as a monitor element.

(3) According to another preferred aspect, the mold clamping pressure Pc, the differential value Pcd of the mold clamping pressure Pc with respect to time and the reduction rate Pcr of the mold clamping pressure Pc with respect to time are included in a plurality of monitored elements, and thus it is possible to utilize substantially one detected element as three (a plurality of) different monitored elements, with the result that it is possible to facilitate the simplification of configuration and cost reduction.

(4) According to another preferred aspect, as the differential value Pcd, a differential value obtained by directly differentiating the mold clamping pressure Pc or a differential value obtained by the least-squares method can be utilized, and thus, it is possible to select a more effective differentiation method according to the behavior of the detected mold clamping pressure Pc.

(5) According to another preferred aspect, as a mold clamping force obtained by increasing the mold clamping force by a predetermined amount, the immediately set mold clamping force is used, and thus it is possible to easily and accurately set the proper mold clamping force Fs by utilizing the immediately preceding mold clamping force with which flash has been already found to be prevented from occurring.

(6) According to another preferred aspect, when the mold clamping force is sequentially (100%, 80%, . . . ) lowered from the maximum mold clamping force (100%), the limit value Fd is set, and then if a variation that exceeds predetermined threshold is not produced even when the mold clamping force reaches the limit value Fd, the limit value Fd is set as the proper mold clamping force Fs. Thus, it is possible to set a proper mold clamping force reflecting the actual quality of a molded item (the thickness, weight and the like of the molded item) and other factors such as energy saving effects.

(7) According to another preferred aspect, the detection signal Dpn corresponding to the mold clamping pressure Pc is filtered by the filter processing portion 7 to remove noise, and thus it is possible to obtain the accurate mold clamping pressure Pc whose noise is removed, with the result that it is possible to facilitate the more accurate and stable setting of the proper mold clamping force Fs.

DESCRIPTION OF EMBODIMENTS

The present invention will now be described in detail, using a preferred embodiment of the present invention, based on the accompanying drawings. The accompanying drawings are not used for specifying the present invention but are used to make the invention easily understood. The detailed description of known parts will be omitted so as not to make the invention unclear.

The configuration of an injection molding machine M that can perform a method of setting a mold clamping force according to this embodiment will first be described with reference to FIGS. 3 and 4.

Figure 3:
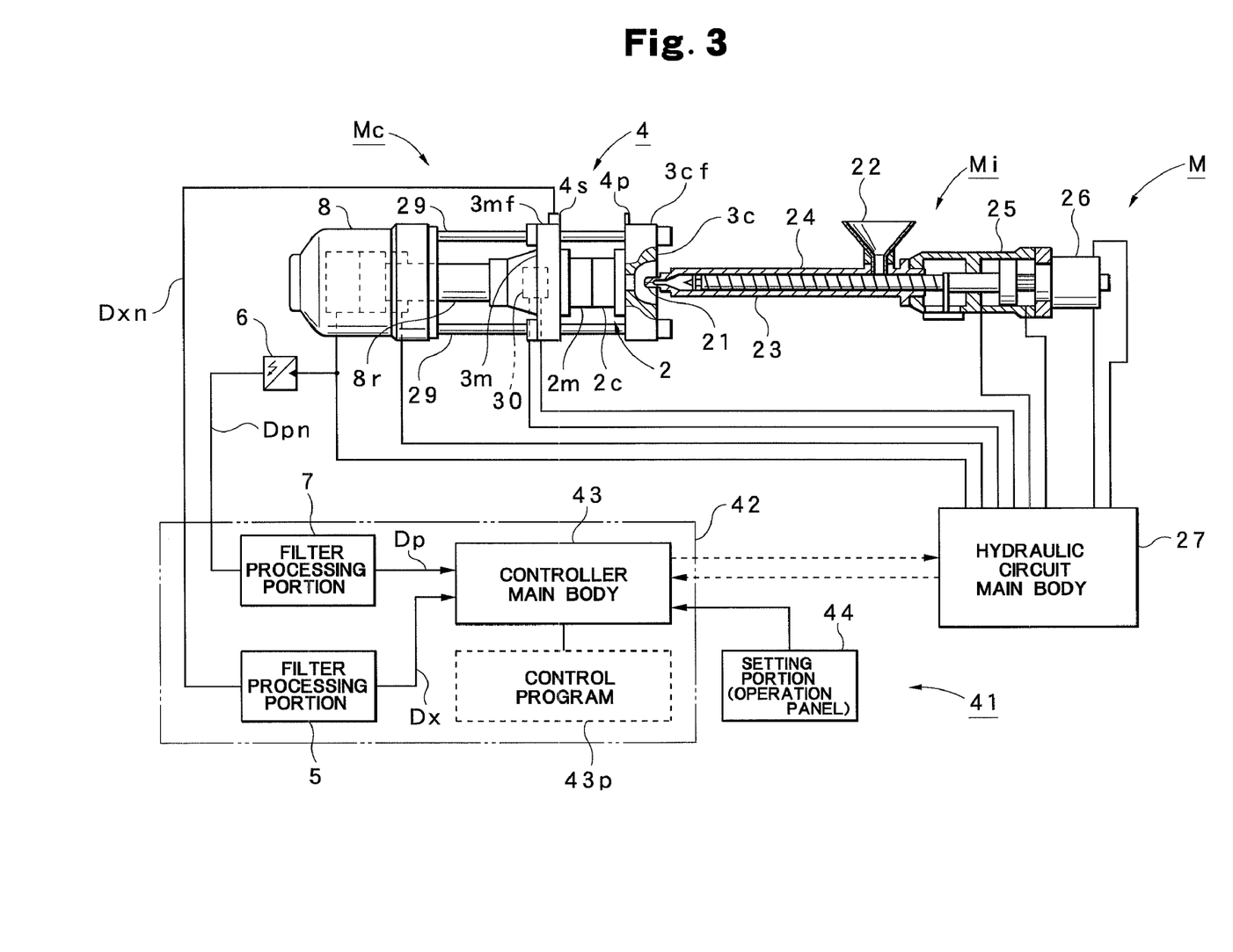
FIG. 3 is a diagram showing the configuration of an injection molding machine that can perform the method of setting a mold clamping force.
Figure 4:
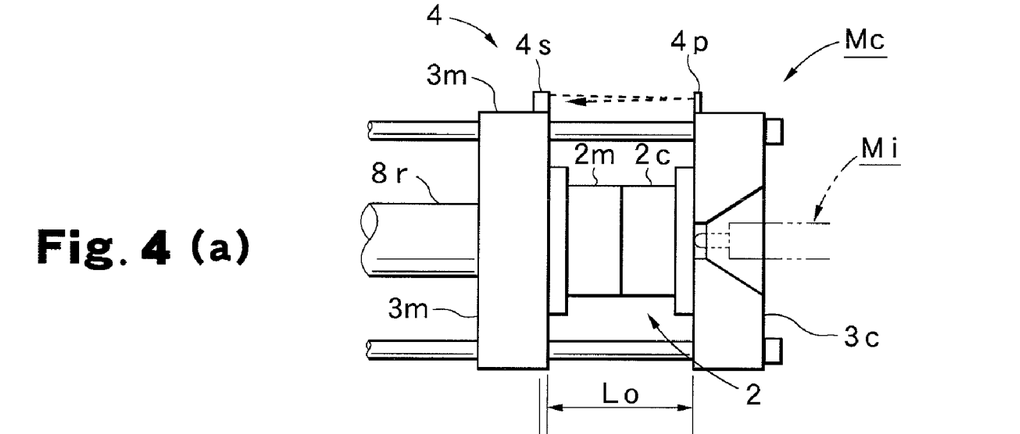
FIG. 4 is a schematic diagram of a mold clamping device to show the principle of the method of setting a mold clamping force.
Figure 5:
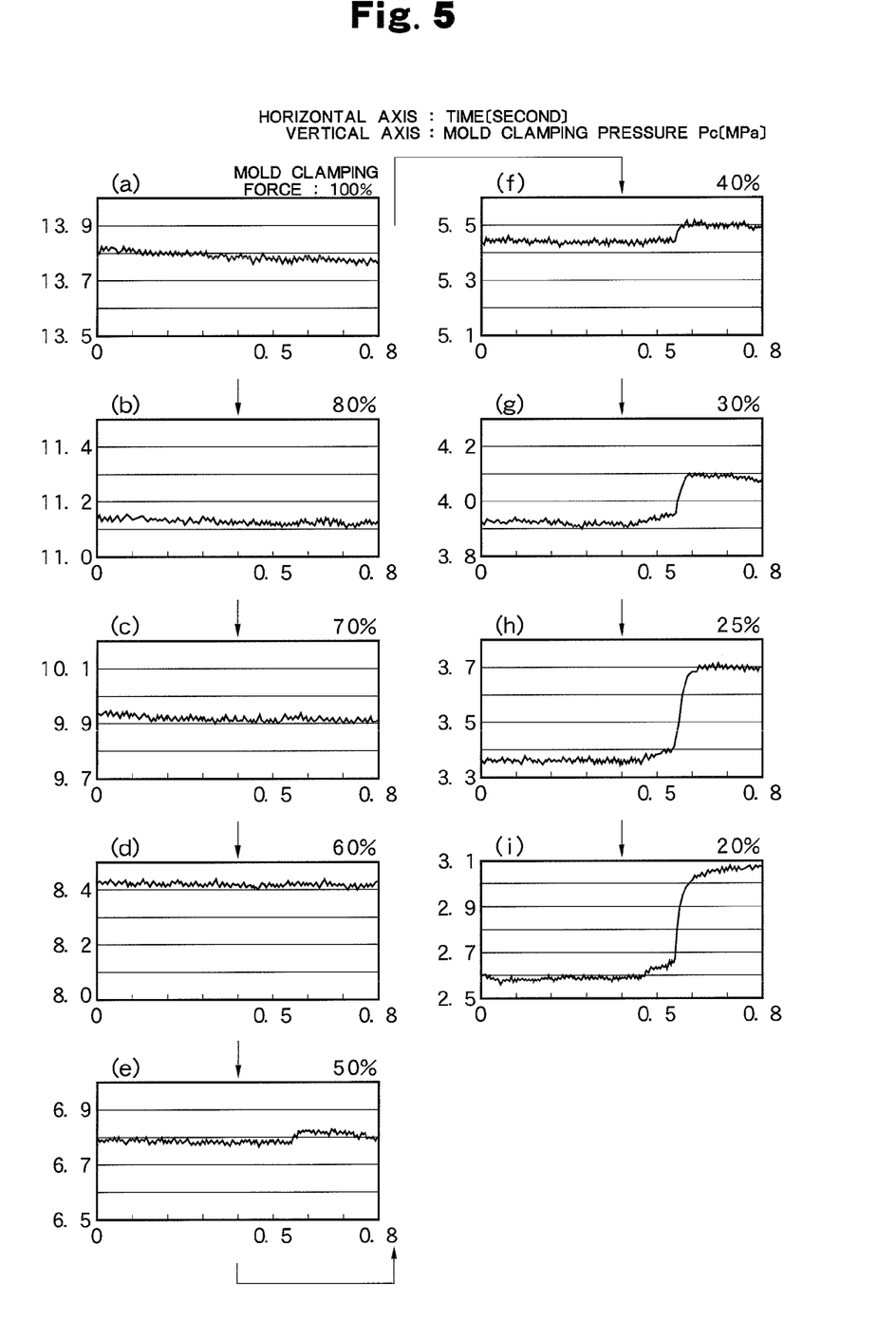
FIG. 5 is a characteristic diagram showing the variation of a mold clamping Pressure with respect to time at each different mold clamping force in order to show the principle of the method of setting a mold clamping force.

In FIG. 3, the reference numeral M represents an injection molding machine, and it is provided with an injection device Mi and a mold clamping device Mc. The injection device Mi is provided with a heating cylinder 23 that has an injection nozzle 21 at the front end and a hopper 22 for material supply at the rear portion; the heating cylinder 23 incorporates a screw 24. At the rear portion of the heating cylinder 23, an injection cylinder 25 and a measurement motor (oil motor) 26 are provided; the injection cylinder 25 and the measurement motor 26 are connected to a hydraulic circuit main body 27 including a hydraulic pump and various switching valves. On the other hand, the mold clamping device Mc is provided with a fixed platen 3c installed on an unillustrated machine stage and a mold clamping cylinder 8 installed away from the fixed platen 3c. Between the fixed platen 3c and the clamping cylinder 8, four tie bars 29 . . . are provided; a movable platen 3m is slidably loaded onto these tie bars 29 . . . Thus, the movable platen 3m has bearing hole portions through which the tie bars 29 . . . are inserted. The end of a ram 8r protruding from the clamping cylinder 8 is coupled with the rear surface of the movable platen 3m. A fixed mold 2c is supported by the fixed platen 3c, and a movable mold 2m is supported by the movable platen 3m; the fixed mold 2c and the movable mold 2m constitute a mold 2. The clamping cylinder 8 and a protrusion cylinder 30 incorporated in the movable platen 3m are connected to the hydraulic circuit main body 27.

On the other hand, the reference numeral 41 represents a molding machine controller. The molding machine controller 41 is provided with a controller main body 43 having a computer function; this controller main body 43 incorporates a CPU that performs various types of control processing and computation processing and the like and a memory that can store various types of data and the like, and stores a control program 43p that can realize the method of setting a mold clamping force, described later and according to this embodiment. The reference numeral 44 represents a setting portion (an operation panel) attached to the controller main body 43;

the setting portion can perform various settings. In this setting portion 44, display is achieved on a display attached thereto and the display employs a touch panel method.

On the other hand, a mold clamping pressure sensor (pressure sensor) 6 used to perform the method of setting a mold clamping force according to this embodiment is connected to the molding machine controller 41. The mold clamping pressure sensor 6 is connected such that the hydraulic pressure of the rear oil compartment of the mold clamping cylinder 8 can be detected. A detection signal Dpn obtained from the mold clamping pressure sensor 6 is supplied to a controller main body 43 through a filter processing portion 7 that eliminates noise. For filtering performed by the filter processing portion 7, a moving average method or a moving least-squares method can be used. Thus, a detection signal Dp obtained from the filter processing portion 7 by removing noise is detected as a mold clamping pressure Pc. As described above, the detection signal Dpn obtained from the mold clamping pressure sensor 6 is filtered by the filter processing portion 7 to remove noise, and thus it is possible to obtain the accurate mold clamping pressure Pc whose noise is removed, with the result that it is possible to facilitate the more accurate and stable setting of the proper mold clamping force Fs. A mold position sensor 4 is connected to the molding machine controller 41. The mold position sensor 4 is formed with a combination of: a distance measurement sensor portion 4s that utilizes an ultrasonic sensor or the like attached to the outer surface 3mf of the movable platen 3m; and a plate-to-be-detected portion 4p attached to the outer surface 3cf of the fixed platen 3c. A plurality of pairs of mold position sensors 4 are preferably provided at a plurality of different positions in terms of obtaining the average value. A detection signal Dxn obtained from the mold position sensor 4 (the distance measurement sensor portion 4s) is supplied to the controller main body 43 through a filter processing portion 5 that removes noise. This filter processing portion 5 can be configured similar to the filter processing portion 7. In this way, the detection signal Dx obtained from the filter processing portion 5 by removing noise is detected as a mold position Xc, in other words, the detection signal Dx is detected as the relative position (mold position) Xc of the movable platen 3m to the fixed platen 3c.

The method of setting a mold clamping force with the injection molding machine M according to this embodiment will now be described with reference to FIGS. 1 to 12.

The principle of the method of setting a mold clamping force according to this embodiment (the present invention) will first be described with reference to FIGS. 4 and 6.

FIGS. 5(a) to 5(i) show the variation of the mold clamping pressure Pc (MPa) when test molding is performed, and especially show, after the mold 2 is clamped by the mold clamping device Mc, a characteristic of the variation of the mold clamping pressure Pc (MPa) detected by the mold clamping pressure sensor 6 with respect to a period of time (second) of an injection process where resin is injected and filled from the injection device Mi into the mold 2; FIGS. 5(a) to 5(i) show cases where the mold clamping force is set at 100% (the maximum mold clamping force), 80%, 70%, 60%, 50%, 40%, 30%, 25% and 20%.

As is obvious from FIGS. 5(a) to 5(d), since, when the mold clamping force falls with a range of 60 to 100%, the mold clamping force is relatively large, the mold 2 is little affected by the resin pressure, with the result that the mold clamping force gradually decreases with time. This is because, when a hydraulic direct-pressure type mold clamping device Mc is used, oil retained in the mold clamping cylinder 8 leaks. Hence, since, at the time of the mold clamping force of 100%, the effects of the leakage of the oil are the most significant, a reduction rate Pcr with respect to time is the largest, and the reduction rate Pcr gradually decreases because the effects of the resin pressure are produced as the mold clamping force gradually decreases. This reduction rate Pcr increases as the oil temperature increases. On the other hand, as is obvious from FIGS. 5(e) to 5(i), since, when the mold clamping force falls within a range of 20 to 50%, the effects of the resin pressure becomes relatively large, the mold clamping force is rapidly increased as the resin is filled. Thus, when the mold clamping force exceeds a predetermined amount, the movable mold 2m is opened, with the result that flash is produced.

FIGS. 6(a) to 6(i) show the variation of the mold position Xc (mm) when test molding is performed, and especially show, after the mold 2 is clamped by the mold clamping device Mc, a characteristic of the variation of the mold position Xc (mm) detected by the mold position sensor 4 with respect to a period of time (second) of an injection process where resin is injected and filled from the injection device Mi into the mold 2; FIGS. 6(a) to 6(i) show cases where the mold clamping force is set at 100% (the maximum mold clamping force), 80%, 70%, 60%, 50%, 40%, 30%, 25% and 20%.

Figure 6:
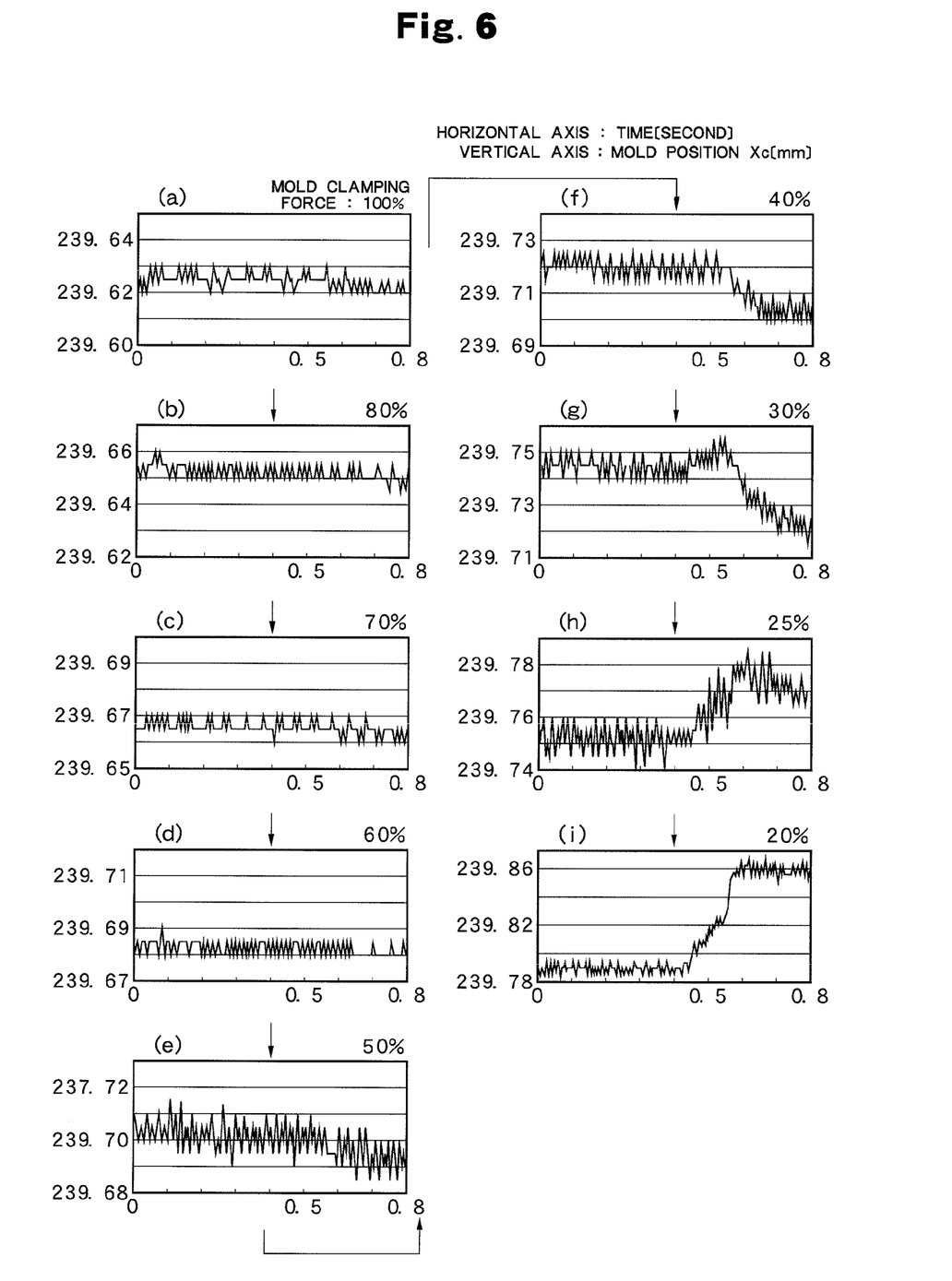
FIG. 6 is a characteristic diagram showing the variation of the position of a mold with respect to time at each different mold clamping force in order to show the principle of the method of setting a mold clamping force.

As is obvious from FIGS. 6(a) to 6(i), since, when the mold clamping force falls with a range of 60 to 100%, the mold clamping force is relatively large, the mold 2 is little affected by the resin pressure, and thus the mold position Xc remains almost the same. The condition of the mold 2 in this case is shown in FIG. 4(a). The symbol Lo represents the space between the movable platen 3m and the fixed platen 3c measured by the mold position sensor 4. On the other hand, in a case where the mold clamping force is 50% as shown in FIG. 6(e), it is observed that, halfway through the injection/filling process, the mold position Xc is varied in a closed direction (the reverse direction), and this continues until a case where the mold clamping force is 30% as shown in FIG. 6(g). This is probably because, as shown in FIG. 4(b), since, even when the mold 2 is closed, the mold clamping force is lowered, the mold 2 is deformed by the resin pressure, with the result that the center side of the mold 2 is expanded and the movable platen 3m and the fixed platen 3c are curved, and the outer surfaces 3mf and 3cf of the movable platen 3m and the fixed platen 3c are displaced in a direction (in a closed direction) in which they approach each other. In FIG. 4(b), the symbol Ls represents the space between the movable platen 3m and the fixed platen 3c measured by the mold position sensor 4; the space Ls is less than the space Lo shown in FIG. 4(a). As shown in FIGS. 6(h) and 6(i), when the mold clamping force is less than 25%, the mold position Xc is varied in an open direction halfway through the injection/filling process. This is because, since, as shown in FIG. 4(c), the resin pressure is greater than the mold clamping force, the movable mold 2m (the movable platen 3m) are pushed in the open direction and thus the mold 2 is opened. In FIG. 4(c), the symbol Lm represents the space between the mold position sensor 4 and the fixed platen 3c measured by the mold position sensor 4; the space Lm is greater than the space Lo shown in FIG. 4(a).

Thus, when the mold position sensors 4 provided on the outer surfaces 3cf and 3mf of the fixed platen 3c and the movable platen 3m are used, the relative position (the mold position Xc) of the movable platen 3m to the fixed platen 3c is detected, and thus it is possible not only to detect the opening of the mold 2 but also the deformation of the mold 2 by the resin pressure, and, more specifically, it is possible to detect an abnormal phenomenon in which the mold position Xc is varied in the reverse direction (in the closed direction) before the opening of the mold 2; the monitoring of the phenomena before and after the opening of the mold 2 makes it possible to set the proper mold clamping force Fs with which can prevent the occurrence of flash.

The method of setting a mold clamping force by utilizing the above-described principle according to this embodiment will now be described step by step.

A mold clamping force automatic setting mode is provided for the molding machine controller 41. In the mold clamping force automatic setting mode, the mold clamping pressure Pc and the mold position Xc to be detected are monitored, and a determination is made in consideration of the possibility of the occurrence of flash.

In this case, with respect to the mold clamping pressure Pc, three (a plurality of) different monitored elements on the variation of the mold clamping pressure Pc are determined. As the monitored elements, the mold clamping pressure Pc, a differential value Pcd of the mold clamping pressure Pc with respect to time and the reduction rate Pcr of the mold clamping pressure Pc with respect to time are used. The mold clamping pressure Pc, the differential value Pcd and the reduction rate Pcr are included in a plurality of monitored elements in this way, and thus it is possible to utilize substantially one detected element as three different monitored elements, with the result that it is possible to facilitate the simplification of configuration and cost reduction. In particular, since, as the mold clamping device Mc, a hydraulic direct-pressure type mold clamping device that clamps the mold 2 with the mold clamping cylinder 8 is used, the reduction rate Pcr of the mold clamping pressure Pc with respect to time based on the fact that oil leaks from the mold clamping cylinder 8 in an injection process can be used as a monitor element. As the differential value Pcd, a differential value obtained by directly differentiating the mold clamping pressure Pc or a differential value obtained by the least-squares method can be utilized. Thus, it is possible to select a more effective differentiation method according to the behavior of the detected mold clamping pressure Pc. When there is no special behavior, it is preferable to use the least-squares method.

Hence, for the mold clamping pressure Pc, a first threshold value Pcs obtained by adding a predetermined offset value to a mold clamping pressure Pco at the time of the completion of mold clamping is previously set. For the differential value Pcd, a second threshold value Pcds of a predetermined amount is set. For the reduction rate Pcr, a third threshold value Pcrs obtained by adding a predetermined offset value to the reduction rate of a mold clamping pressure measured in a period from the completion of mold clamping to the start of injection with respect to time is set. The offset values corresponding to the first threshold value Pcs, the second threshold value Pcds and the third threshold value Pcrs are set as fixed values obtained by previously performing a test or the like or can be freely set by a user in consideration of the condition of a molded item or the like. In FIGS. 7 to 10, the first threshold value Pcs, the second threshold value Pcds and the third threshold value Pcrs are shown.

On the other hand, with respect to the mold position Xc, a lower limit threshold value Xcd and an upper limit threshold value Xcu are used. The lower limit threshold value Xcd is set by subtracting a predetermined offset value from the mold position Xc at the time of completion of mold clamping. The predetermined offset value is set as a fixed value obtained by previously performing a test or the like or can be freely set by the user in consideration of the condition of the molded item or the like. The lower limit threshold value Xcd that is set in this way can be utilized as the first warning (flash warning 2) about the likelihood of the occurrence of flash based on the condition before the opening of the mold 2, that is, before the occurrence of flash. The upper limit threshold value Xcu is set by adding a predetermined offset value to the mold position Xc at the time of completion of mold clamping. The predetermined offset value is set as a fixed value obtained by previously performing a test or the like or can be freely set by the user in consideration of the condition of the molded item or the like. The upper limit threshold value Xcu that is set in this way can be utilized as the second warning (flash warning 3) about the occurrence of flash after the opening of the mold 2, that is, after the occurrence of flash. The lower limit threshold value Xcd and the upper limit threshold value Xcu are shown in FIGS. 7 to 10.

Figure 11:
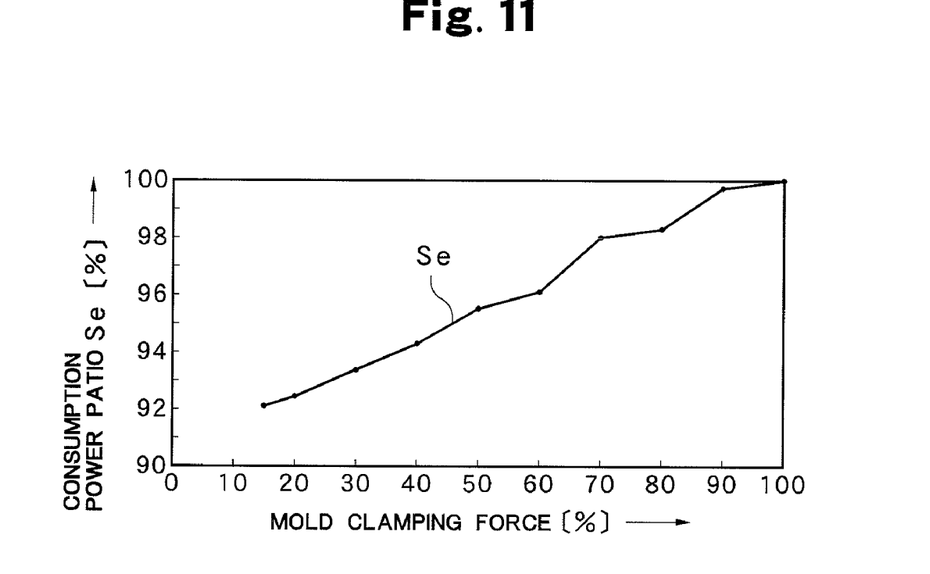
FIG. 11 is a characteristic diagram showing the variation of a consumption power ratio with respect to the mold clamping force when the mold clamping force is set lower in a sequential manner.
Figure 12:
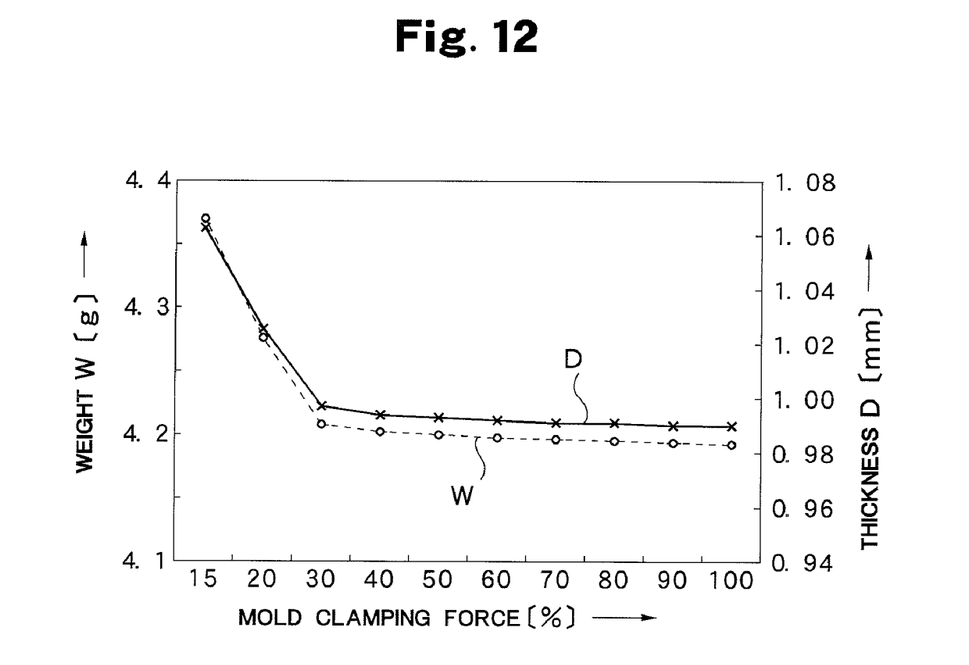
FIG. 12 is a characteristic diagram showing the variation of the weight and thickness of a molded item with respect to the mold clamping force when the mold clamping force is set lower in a sequential manner.

The limit value Fd when the mold clamping force is lowered is set for a mold clamping force (100%, 80%, . . . ) obtained by substantially lowering the mold clamping force from the maximum mold clamping force (100%). Even if the mold clamping force is sequentially lowered, for example, to a mold clamping force of 30%, depending on the mold, the mold clamping pressure Pc, the differential value Pcd and the reduction rate Pcr are likely not to reach the first threshold value Pcs, the second threshold value Pcds and the third threshold value Pcrs, respectively, and the mold position Xc is likely not to be varied so as to be equal to or less than the lower limit threshold value Xcd or equal to or more than the upper limit threshold value Xcu. However, even in this case, since adverse effects may be produced, it is possible to set the limit value Fd for the mold clamping force when the mold clamping force is lowered. For example, FIG. 11 shows a power consumption ratio Se (%) (ratio with respect to the power consumption in the maximum mold clamping force) of the mold clamping force obtained by sequentially lowering a predetermined amount from the maximum mold clamping force (100%); FIG. 12 shows the weight W (g) and the thickness D (mm) of a molded item with respect to the mold clamping force obtained by sequentially lowering a predetermined amount from the maximum mold clamping force (100%). In the case of the weight W (g) and the thickness D (mm) of the molded item, when the mold clamping force is less than 30%, the weight W (g) and the thickness D (mm) are rapidly varied. Thus, in this case, the limit value Fd is set at 30%, and thus it is possible not only to avoid unstable molding but also to set a proper mold clamping force reflecting the actual quality (such as the thickness and weight of the molded item) of the molded item and other factors such as energy saving effects.

The procedure of the mold clamping force automatic setting mode will now be described with reference to flowcharts shown in FIGS. 1 and 2 and variation characteristics shown in FIGS. 7 to 10.

In the mold clamping force automatic setting mode, test molding is performed by sequentially clamping a mold with the mold clamping force (100%, 80%, 70%, . . . ) obtained by sequentially lowering a predetermined amount from the maximum mold clamping force (100%), the mold clamping pressure Pc in the injection process is detected and a plurality of different monitored elements (Pc, Pcd and Pcr) on the variation of the mold clamping pressure Pc are monitored. Thus, it is possible to automatically set, as the proper mold clamping force Fs, a mold clamping force obtained by increasing, by a predetermined amount, the mold clamping force at the time of the occurrence of such as variation that at least one of the monitored elements is varied to exceed the predetermined threshold value.

Figure 1:
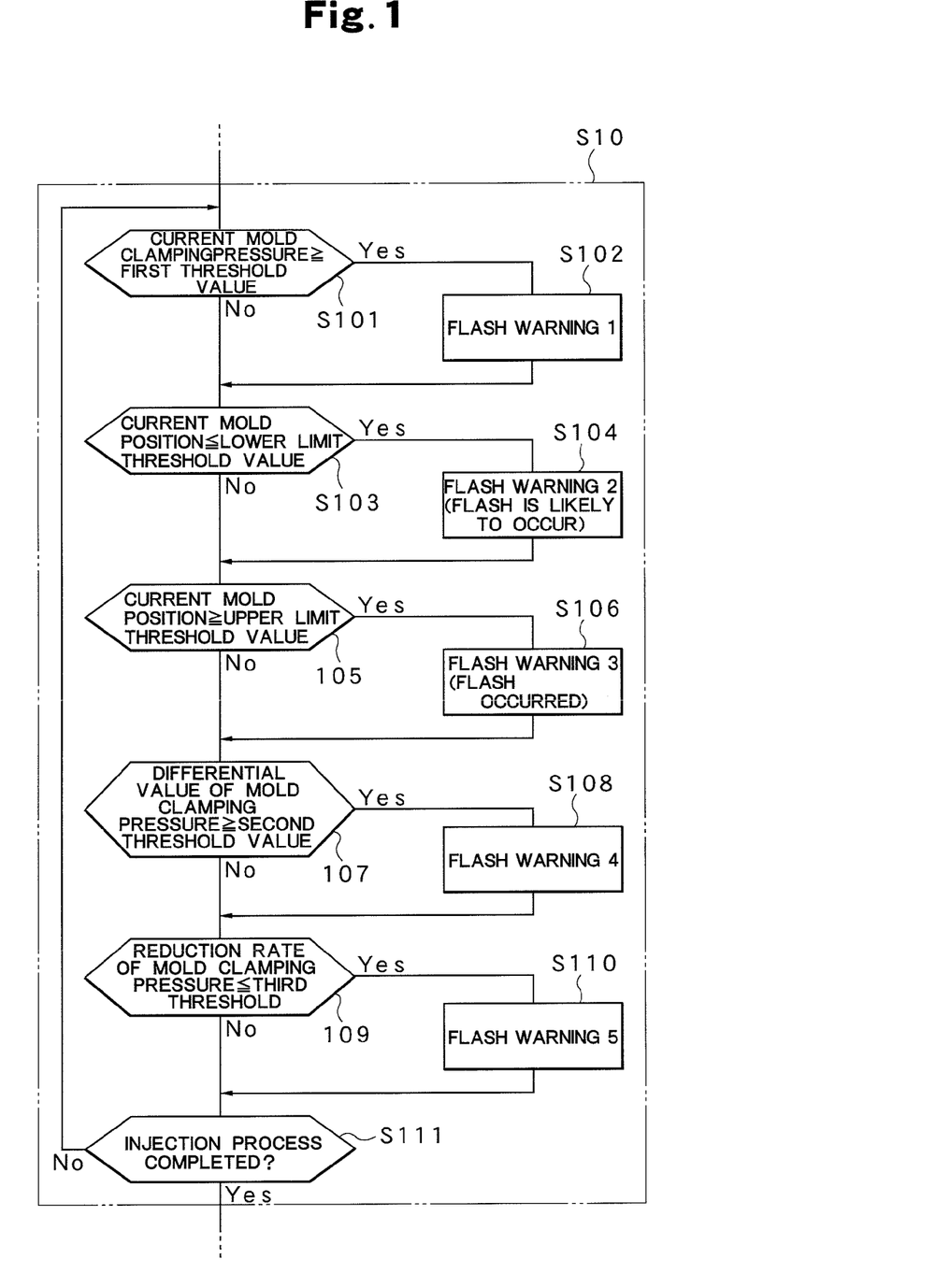
FIG. 1 is a flowchart specifically showing flash occurrence determination processing in a method of setting a mold clamping force according to a preferred embodiment of the present invention.
Figure 2:
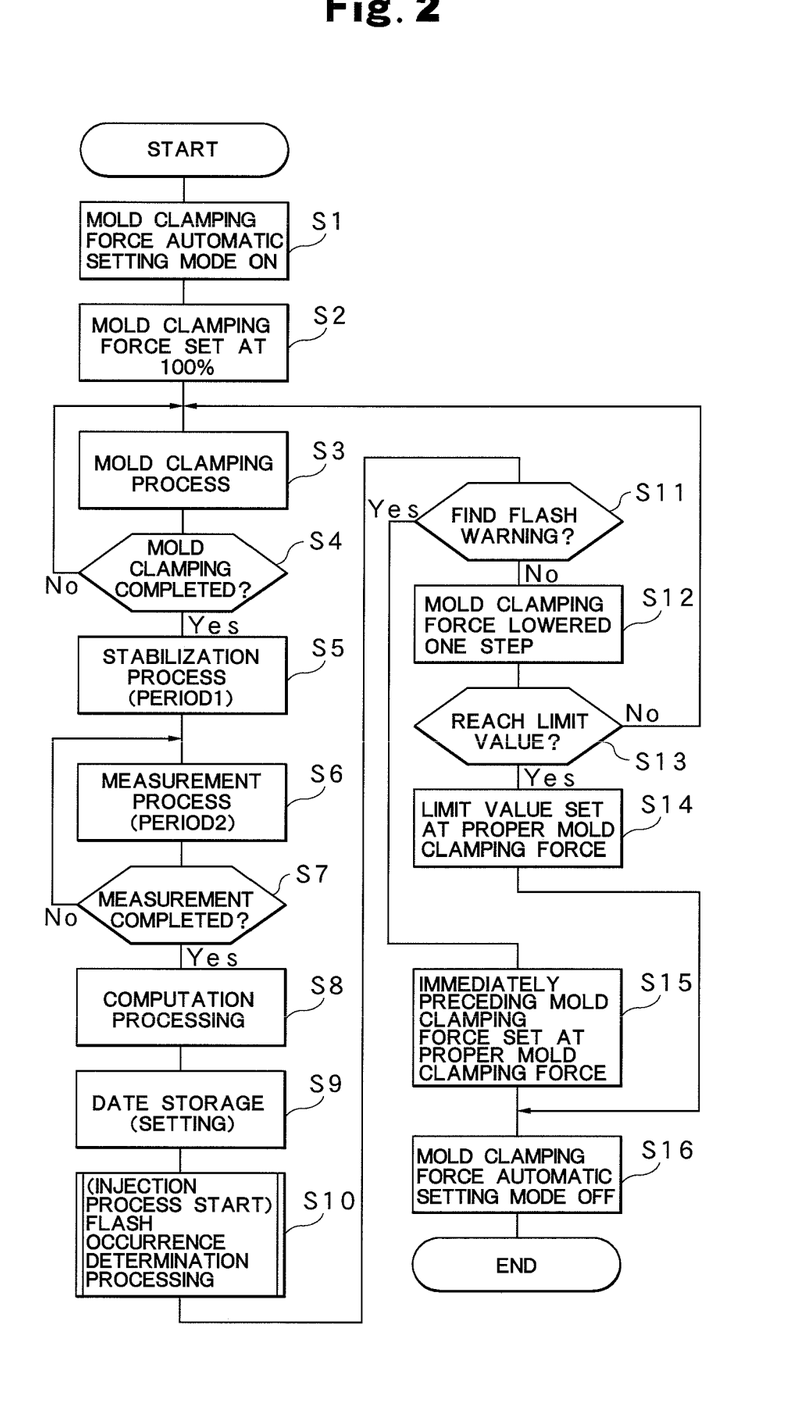
FIG. 2 is a flowchart showing the procedure of the method of setting a mold clamping force.
Figure 7:
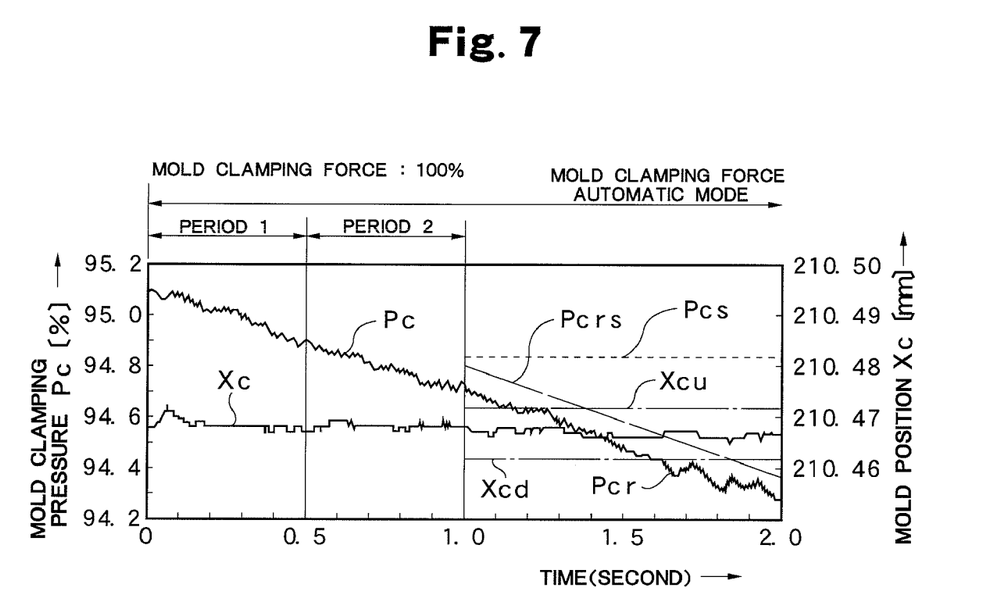
FIG. 7 is a characteristic diagram showing the variation of the mold clamping pressure and the position of the mold with respect to time when the method of setting a mold clamping force is performed with a 100% mold clamping force.
Figure 8:
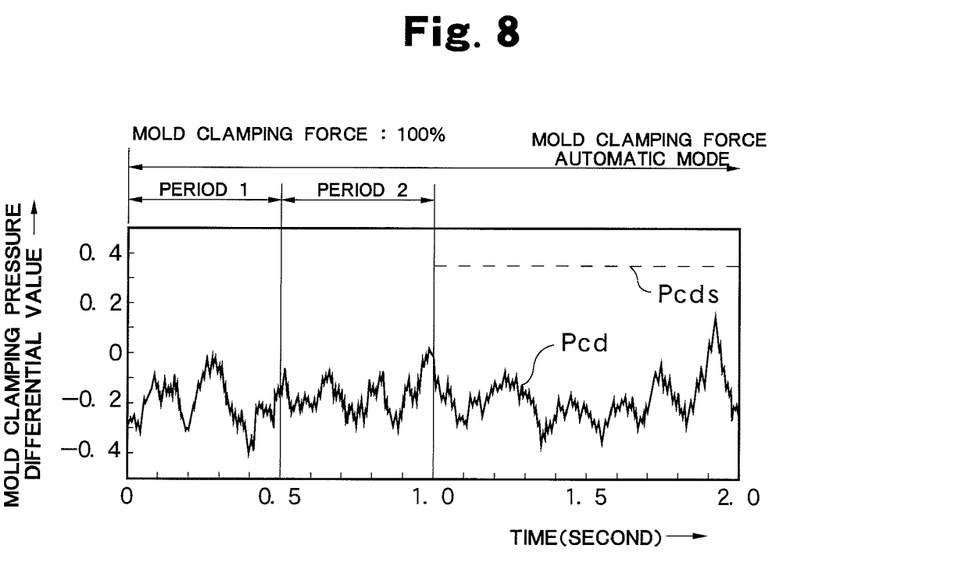
FIG. 8 is a characteristic diagram showing the variation of the differential value of the mold clamping pressure with respect to time when the method of setting a mold clamping force is performed with a 100% mold clamping force.

The procedure will be specifically described below with reference to FIG. 2 (FIG. 1). First, in order for the mold clamping force automatic setting mode to be used, the mold clamping force automatic setting mode is selected (ON) from the setting portion (the operation panel) 44 (step 1). Thus, the mold clamping force that is set is reset, and the mold clamping force is set at 100% (the maximum mold clamping force) (step 2). Then, the mold clamping process is performed with the mold clamping force of 100% (steps S3 and S4). On the other hand, the mold clamping process is completed, and then the process proceeds to a stabilization process (step S5). FIG. 7 shows a characteristic of the variation of the mold clamping pressure Pc (%) (including the reduction rate Pcr) and the mold position Xc (mm) with respect to time (second) when the mold clamping force is set at 100%; FIG. 8 shows a characteristic of the variation of the differential value Pcd of the mold clamping pressure Pc with respect to time (second) when the mold clamping force is set at 100%. The starting point of the time axis is at the time of the completion of mold clamping. The stabilization process is performed in period 1 shown in FIGS. 7 and 8; an interval time of 0.5 second from the time of the completion of mold clamping is used to stabilize the condition.

The stabilization process (period 1) is completed, and then the process proceeds to a measurement process (step S6). The measurement process is performed in period 2 shown in FIGS. 7 and 8; various measurements are performed during a period of 0.5 second after the completion of period 1. Specifically, in order for the mold clamping pressure Pco and the mold position Xco at the time of the completion of mold clamping and the reduction rate Pcr of the mold clamping pressure Pc with respect to time in period 2 to be determined, the elapsed time, the mold clamping pressure, the number of times and the like are detected (measured). The measurement process is completed, and then necessary computation processing is performed (steps S7 and S8). Specifically, the reduction rate Pcr of the mold clamping pressure Pc with respect to time is determined from the elapsed time, the mold clamping pressure and the number of times with a predetermined computation equation, and the differential value Pcd of the mold clamping pressure Pc is determined with a predetermined computation equation. The lower limit threshold value Xcd is calculated by subtracting a predetermined offset value from the detected mold position Xco; the upper limit threshold value Xcu is calculated by adding a predetermined offset value to the mold position Xco. Then, the data determined by the computation processing and the data obtained in the measurement process are stored (set) in a memory (step S9).

Then, the injection process is started, and the resin is injected into the mold 2, and flash occurrence determination processing is performed (step S10). In FIG. 1, the procedure of the flash occurrence determination processing is specifically shown. In the flash occurrence determination processing, whether or not the mold clamping pressure Pc (the current mold clamping pressure) detected by the mold clamping pressure sensor 6 is equal to or more than the first threshold value Pcs is first determined (step S101). Here, if the mold clamping pressure Pc is equal to or more than the first threshold value Pcs, the flash warning 1 is output (step S102). Then, whether or not the mold position Xc (the current position of the mold) detected by the mold position sensor 4 is equal to or less than the lower limit threshold value Xcd is determined (step S103). Here, if the mold position Xc is equal to or less than the lower limit threshold value Xcd, the flash warning 2 is output (step S104). Moreover, whether or not the detected mold position Xc (the current position of the mold) is equal to or more than the upper limit threshold value Xcu is determined (step S105). Here, if the mold position Xc is equal to or more than the upper limit threshold value Xcu, a flash warning 3 is output (step S106). Then, the differential value Pcd of the detected mold clamping pressure Pc is determined, and whether or not the differential value Pcd is equal to or more than the second threshold value Pcds is determined (step 107). Here, if the differential value Pcd is equal to or more than the second threshold value Pcds, a flash warning 4 is output (step S108). Moreover, whether or not the reduction rate Pcr of the mold clamping pressure Pc is equal to or less than the third threshold value Pcrs is determined (step 109). Here, if the reduction rate Pcr of the mold clamping pressure Pc is equal to or less than the third threshold value Pcrs, a flash warning 5 is output (step S110). The above-described flash occurrence determination processing is continuously performed at regular intervals until the completion of the injection process (step S111).

After the completion of the injection process (flash occurrence determination processing), whether or not the flash warning is output is checked (step S11). When the mold clamping force shown in FIGS. 7 and 8 is 100% (the maximum mold clamping force), the mold clamping pressure Pc is kept less than the first threshold value Pcs, the mold position Xc exceeds the lower limit threshold value Xcd and is kept less than the upper limit threshold value Xcu, the differential value Pcd is kept less than the second threshold value Pcds and the reduction rate Pcr is kept less than the third threshold value Pcrs. In all the cases, no flash warning is output. Thus, the mold clamping force is set at 80% by being lowered one step (step S12). Here, if the mold clamping force that is set does not reach the limit value Fd, the mold clamping process with the mold clamping force of 80% is performed, test molding is performed and the flash occurrence determination processing is performed (steps S13, S3 to S13). Consequently, if no flash warning is output in each determination, the mold clamping force is sequentially reduced to 70%, 60%, 50%, . . . , and the same processing is continuously repeated.

Figure 9:
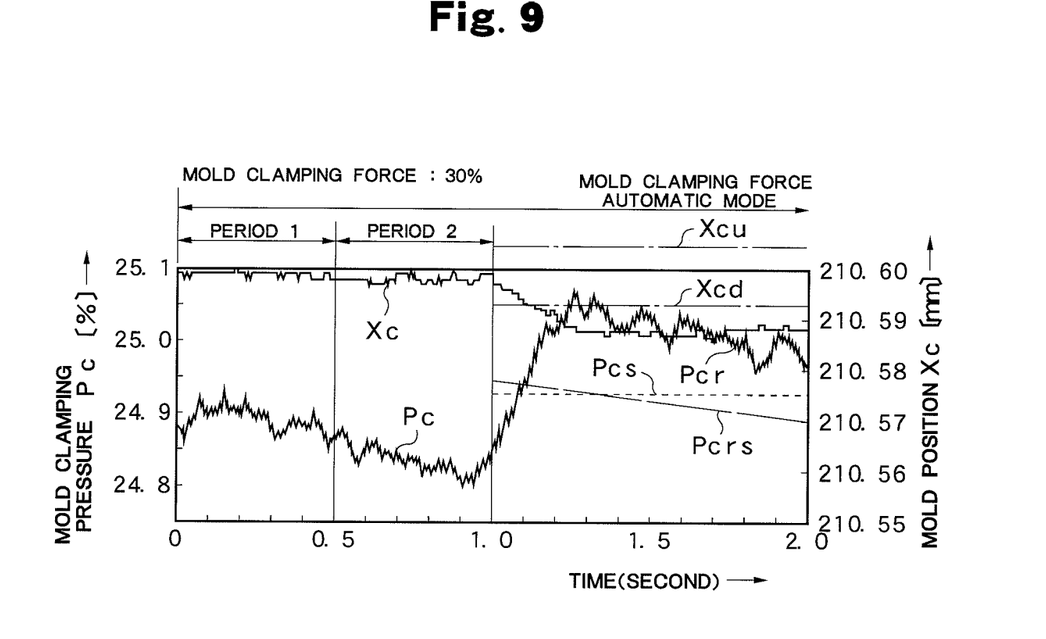
FIG. 9 is a characteristic diagram showing the variation of the mold clamping pressure with respect to time when the method of setting a mold clamping force is performed with a 30% mold clamping force.
Figure 10:
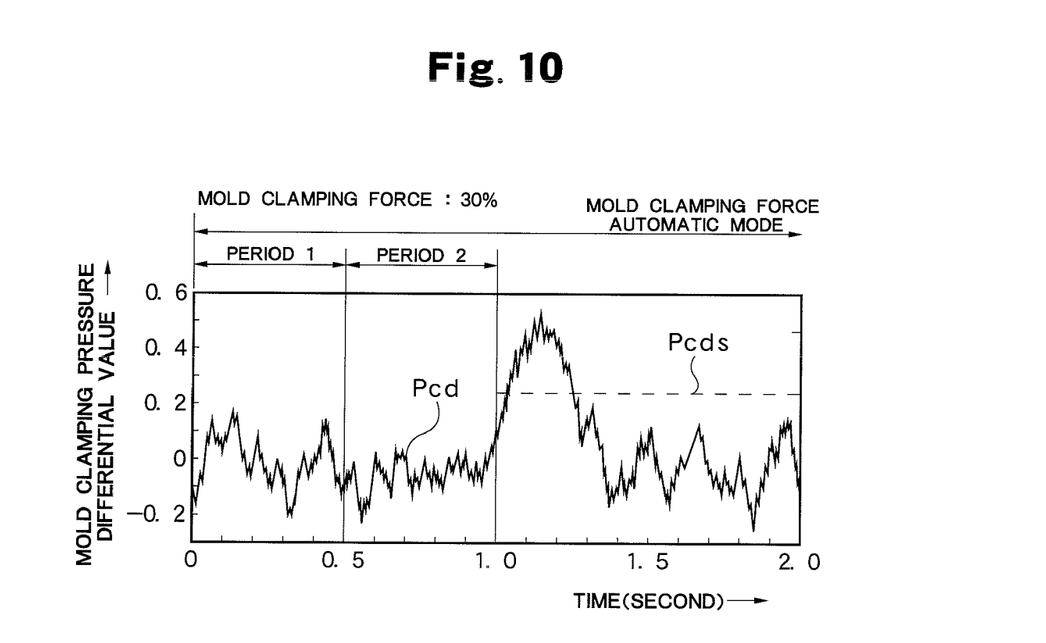
FIG. 10 is a characteristic diagram showing the variation of the differential value of the mold clamping pressure with respect to time when the method of setting a mold clamping force is performed with the 30% mold clamping force.

On the other hand, if at least one of the flash warnings 1 to 5 is output, the immediately preceding mold clamping force is set as the proper mold clamping force (steps S11 and S15). For example, FIGS. 9 and 10 show a case where the mold clamping force is set at 30%, and, in this case, as shown in FIG. 9, since the mold clamping pressure Pc is equal to or more than the first threshold value Pcs, the flash warning 1 is output. Although the mold position Xc is kept less than the upper limit threshold value Xcu, since the lower limit threshold value Xcd is equal to or less than the lower limit threshold value Xcd, the flash waning 2 is output. Moreover, since the reduction rate Pcr is equal to or less than the third threshold value Pcrs, the flash warning 5 is output. On the other hand, as shown in FIG. 10, since the differential value Pcd is equal to or more than the second threshold value Pcds, the flash warning 4 is output. After all, the three flash warnings 1, 4 and 5 are output for the mold clamping pressure Pc, and the one flash warning 2 is output for mold position Xc. Thus, in this case, test molding is not performed afterward, and the immediately preceding (in this case, 40%) mold clamping force is set as the proper mold clamping force Fs. Hence, in this case, a 10% increase is added to the mold clamping force of 30%, with the result that the mold clamping force is set at 40%. The immediately previously set mold clamping force is used as the mold clamping force obtained by increasing a predetermined amount in this way, and thus it is possible to easily and accurately set the proper mold clamping force Fs by utilizing the immediately preceding mold clamping force, with which flash has already been found to be prevented. In this way, a series of setting processing is completed, with the result that the mold clamping force automatic setting mode is turned off (step S16).

On the other hand, since the limit value Fd is set, for example, it is set at 40%, when the mold clamping force is lowered to 40%, the test molding is not performed thereafter, and the limit value Fd of 40% is set at the proper mold clamping force Fs (steps S13 and S14). As described above, when the mold clamping force is sequentially lowered to a mold clamping force (100%, 80%, . . . ) from the maximum mold clamping force (100%), the limit value Fd is set, and then if a variation that meets predetermined conditions is not produced even when the mold clamping force reaches the limit value Fd, the limit value Fd is set as the proper mold clamping force Fs. In this case, on the completion of the setting, the mold clamping force automatic setting mode is turned off (step S16).

In the method of setting a mold clamping force according to this embodiment, the mold clamping pressure Pc in the injection process is detected, and a plurality of different monitored elements (Pc, Pcd and Pcr) corresponding to the variation of the mold clamping pressure Pc are monitored, and thus, if at least one of the monitored elements is varied to exceed the predetermined threshold value, a mold clamping force obtained by increasing the mold clamping force at the time of the production of such a variation by a predetermined amount is set as the proper mold clamping force Fs, with the result that it is possible not only to accurately and reliably set the required minimum proper mold clamping force Fs with which no flash is produced but also to easily set the more accurate proper mold clamping force Fs in an automatic manner.

Although the preferred embodiment is described above in detail, the present invention is not limited to such an embodiment, and any modification, addition and deletion on detailed configurations, shapes, materials, quantities, values, methods (procedures) and the like are possible without departing from the spirit of the present invention. For example, the maximum mold clamping force does not indicate the ability of the mold clamping device Mc, and it means a mold clamping force that is generally used and that includes a rated mold clamping force. Although the above description deals with the case where the immediately previously set mold clamping force is used as a mold clamping force obtained by increasing the mold clamping force by a predetermined amount, the mold clamping force may be increased by adding a predetermined fixed value thereto or it may be increased by multiplying it by a predetermined factor. On the other hand, although the embodiment deals with the case where the determination as to the mold position Xc is included, it is likewise practicable without the determination as to the mold position Xc.

INDUSTRIAL APPLICABILITY

The method of setting a mold clamping force according to the present invention can be applied to various injection molding machines such as the hydraulic injection molding machine incorporating the direct pressure type mold clamping device described above as an example, and electrically driven injection molding machine.

Reference Signs List

2: Mold, 6: Mold clamping pressure sensor, 7: Filter processing portion, 8: Mold clamping cylinder, M: Injection molding machine, Mc: Mold clamping device, Pc: Mold clamping pressure, Pcd: Differential value, Pcr: Reduction rate, Pco: Mold clamping pressure at the time of the completion of mold clamping, Pcs: First threshold value, Pcds: Second threshold value, Pcrs: Third threshold value and Dpn: Detection signal Citation List Patent Literature 1

Japanese Patent No. 3833140

The invention claimed is:

1. A method of setting a mold clamping force of an injection molding machine that sets a mold clamping force smaller than a maximum mold clamping force when a mold is clamped by a mold clamping device, wherein test molding is performed by sequentially clamping the mold with a mold clamping force obtained by sequentially lowering a mold clamping force by a predetermined amount from the maximum mold clamping force; and, when a mold clamping pressure in an injection process is detected with a mold clamping pressure sensor and a plurality of different monitored elements corresponding to a variation of the mold clamping pressure are monitored, wherein the plurality of different monitored elements include at least two of the mold clamping pressure differential value of the mold clamping pressure with respect to time and a reduction rate of the mold clamping pressure with respect to time, and thus it is detected that at least one of the monitored elements is varied to exceed a predetermined threshold, a mold clamping force obtained by increasing a mold clamping force at a time of production of the variation by a predetermined amount is set as a proper mold clamping force.

2. The method of setting a mold clamping force of an injection molding machine according to claim 1, wherein the mold clamping device is a hydraulic direct-pressure type mold clamping device that clamps the mold with a mold clamping cylinder.

3. The method of setting a mold clamping force of an injection molding machine according to claim 1, wherein, when at least one of the monitored elements is varied to exceed the predetermined threshold, the variation is such that the mold clamping pressure is equal to or more than a first threshold value obtained by adding a predetermined offset value to a mold clamping pressure at a time of completion of mold clamping.

4. The method of setting a mold clamping force of an injection molding machine according to claim 3, wherein, when it is detected that a variation equal to or more than the first threshold value is produced, a flash warning is output.

5. The method of setting a mold clamping force of an injection molding machine according to claim 1, wherein, when at least one of the monitored elements is varied to exceed the predetermined threshold, the variation is such that the differential value is equal to or more than a second threshold value of a predetermined amount.

6. The method of setting a mold clamping force of an injection molding machine according to claim 5, wherein, when it is detected that a variation equal to or more than the second threshold value is produced, a flash warning is output.

7. The method of setting a mold clamping force of an injection molding machine according to claim 1, wherein the differential value is a differential value obtained by directly differentiating the mold clamping pressure.

8. The method of setting a mold clamping force of an injection molding machine according to claim 1, wherein the differential value is a differential value obtained by differentiating the mold clamping pressure with least-squares method.

9. The method of setting a mold clamping force of an injection molding machine according to claim 1,
wherein, when at least one of the monitored elements is varied to exceed the predetermined threshold, the variation is such that the reduction rate is equal to or less than a third threshold value obtained by adding a predetermined offset value to a reduction rate of a mold clamping pressure measured between a period from a completion of mold clamping to a start of injection with respect to time.

10. The method of setting a mold clamping force of an injection molding machine according to claim 9,
wherein, when it is detected that a variation equal to or less than the third threshold value is produced, a flash warning is output.

11. The method of setting a mold clamping force of an injection molding machine according to claim 1,
wherein a limit value is set when the mold clamping force is sequentially lowered from the maximum mold clamping force, and, when the mold clamping force reaches the limit value and then a variation that meets the predetermined conditions is not produced, the limit value is set as the proper mold clamping force.

12. The method of setting a mold clamping force of an injection molding machine according to claim 11,
wherein the limit value is set based on when at least one of a weight and a thickness of a molded item is rapidly varied.

13. The method of setting a mold clamping force of an injection molding machine according to claim 1,
wherein a filter processing portion performs filtering for eliminating noise on a detection signal corresponding to the mold clamping pressure.

14. The method of setting a mold clamping force of an injection molding machine according to claim 13,
wherein the filter processing portion performs the filtering with moving average.

15. The method of setting a mold clamping force of an injection molding machine according to claim 13,
wherein the filter processing portion performs the filtering with a moving least-squares method.

16. The method of setting a mold clamping force of an injection molding machine according to claim 1,
wherein the proper mold clamping force is automatically set by a predetermined mold clamping force automatic setting mode.

* * * * *